US007218596B2

(12) United States Patent
Gelernt

(10) Patent No.: US 7,218,596 B2
(45) Date of Patent: May 15, 2007

(54) APPARATUS AND METHOD FOR OPTICAL DATA STORAGE AND RETRIEVAL

(75) Inventor: Barry Gelernt, Oceanside, CA (US)

(73) Assignee: Invent Technologies, LLC, Oceanside, CA (US)

( * ) Notice: Subject to any disclaimer, the term of this patent is extended or adjusted under 35 U.S.C. 154(b) by 535 days.

(21) Appl. No.: 10/824,865

(22) Filed: Apr. 15, 2004

(65) Prior Publication Data
US 2004/0228158 A1    Nov. 18, 2004

Related U.S. Application Data

(60) Provisional application No. 60/469,780, filed on May 12, 2003.

(51) Int. Cl.
*G11B 7/00* (2006.01)
(52) U.S. Cl. .................. 369/100; 369/121; 369/112.01
(58) Field of Classification Search .................... None
See application file for complete search history.

(56) References Cited

U.S. PATENT DOCUMENTS

| | | | |
|---|---|---|---|
| 3,638,201 A | 1/1972 | Borner | |
| 4,091,290 A | 5/1978 | Bjorklund et al. | |
| 4,122,551 A | 10/1978 | Urbach | |
| 4,128,772 A | 12/1978 | Chang et al. | |
| 4,598,395 A | 7/1986 | Smith | |
| 4,712,887 A | 12/1987 | Baer | |
| 5,185,552 A | 2/1993 | Suzuki et al. | |
| 5,194,740 A | 3/1993 | Kogelschatz et al. | |
| 5,499,282 A | 3/1996 | Silfvast | |
| 5,500,459 A | 3/1996 | Hagemeyer et al. | |
| 5,510,230 A | 4/1996 | Tennant et al. | |
| 5,559,338 A | 9/1996 | Elliott et al. | |
| 5,645,964 A | 7/1997 | Nohr et al. | |

(Continued)

FOREIGN PATENT DOCUMENTS

WO    WO 99/63536    12/1999

OTHER PUBLICATIONS

"Hard Disk Recording Aims to Get Perpendicular," Peter Singer, Semiconductor International, Sep. 2002, vol. 25, No. 10, pp. 50-54.

(Continued)

*Primary Examiner*—Muhammad Edun
(74) *Attorney, Agent, or Firm*—Whyte Hirschboeck Dudek SC

(57) ABSTRACT

An optical storage device and method of operating that device are disclosed. The device includes an optical storage medium, and a light source capable of generating light that is transmitted to the medium. The light generated by the light source is at a first wavelength that is within the vacuum ultraviolet region of the electromagnetic spectrum and satisfies at least one of the following criteria: (i) the wavelength is within a 1.0 nm-wide window in the vacuum ultraviolet region of the electromagnetic spectrum at which a local minimum in the absorption coefficient of Oxygen ($O_2$) occurs; and (ii) the absorption coefficient of Oxygen ($O_2$) at standard temperature and pressure that corresponds to the wavelength is less than 25 $atm^{-1}\ cm^{-1}$. In one embodiment, the light is at approximately 121.6 nm, and the light source is a gas discharge light source that produces light at the Hydrogen Lyman-α line.

35 Claims, 3 Drawing Sheets

U.S. PATENT DOCUMENTS

| | | | |
|---|---|---|---|
| 5,686,728 | A | 11/1997 | Shafer |
| 5,848,079 | A | 12/1998 | Kortz et al. |
| 5,858,586 | A | 1/1999 | Nohr et al. |
| 6,028,835 | A | 2/2000 | Thomas |
| 6,243,348 | B1 | 6/2001 | Goodberlet |
| 6,369,398 | B1 | 4/2002 | Gelernt |
| 6,373,869 | B1 | 4/2002 | Jacob |
| 6,525,868 | B2 | 2/2003 | Merriam et al. |
| 6,529,463 | B1 | 3/2003 | Goodberlet |
| 6,605,815 | B2 | 8/2003 | Gelernt |

OTHER PUBLICATIONS

"CD-ROM Technical Summary From Plastic Pits to Fantasia," Andy Poggio, obtained at <http://pauillac.inria.fr/~lang/hotlist/cdrom/Documents/tech-summary.html>, printed Jul. 22, 2004, 7 pgs.

"Everything You Wanted To Know About DVD-R. (Technology Information)", Andy Parsons, Computer Technology Review, Feb. 2000, pp. 1-3 and Mar. 2000, pp. 1-3, obtained at http://www.findarticles.com., printed Jul. 27, 2004.

Quenching and Radiative Lifetimes for NH ($b^1\Sigma^+$, $v^1=0$), B. Gelernt et al., Chemical Physics Letters, vol. 36, No. 2, Nov. 1, 1975, pp. 238-241.

"New Bands In the ND $c^1\Pi$-$a^1\Delta$ System; Spectroscopic Constants Of The $a^1\Delta$ State", W. Cheung, B. Gelernt, and T. Carrington, Chemical Physics Letters, vol. 66, No. 2, Oct. 1, 1979, pp. 287-290.

"Optical Data Storage", H. Coufal and G.W. Burr, International Trends in Applied Optics, ch. 26, 2002, pp. 609-628.

"Blue Laser CD Technology", Robert L. Gunshor and Arto V. Nurmikko, Scientific American, Jul. 1996, pp. 48-51.

"121.6 nm radiation source for advanced lithography", Jianxun Yan et al., J. Vac. Science & Technology B, Microelectronics and Nanometer Structures, vol. 20, No. 6, Nov./Dec. 2002, pp. 2574-2577.

"Prospects for photolithography at 121 nm", V. Liberman et al., J. Vac. Science & Technology B, Microelectronics and Nanometer Structures, vol. 20, No. 6, Nov./Dec. 2002, pp. 2565-2573.

APPARATUS AND METHOD FOR OPTICAL DATA STORAGE AND RETRIEVAL

CROSS-REFERENCE TO RELATED APPLICATIONS

This application claims the benefit of U.S. provisional patent application No. 60/469,780 filed on May 12, 2003 and entitled "Method of Optical Storage".

STATEMENT REGARDING FEDERALLY SPONSORED RESEARCH OR DEVELOPMENT

FIELD OF THE INVENTION

The present invention relates to devices and processes for storing and retrieving data and, more particularly, devices and processes in which data is stored on light-sensitive media by shining light on such media, and in which data stored on such media can be retrieved from the media by detecting light that is reflected by the media.

BACKGROUND OF THE INVENTION

As computers have become increasingly powerful in terms of their data processing capabilities, the desire for systems that are capable of storing and retrieving large amounts of data in a reliable and rapid manner has correspondingly increased. Although volatile memory devices that are capable of storing data only when power is provided to those devices are of importance in meeting this need, non-volatile memory devices that do not require continued energy input in order to maintain the recorded data also continue to be of importance.

Most non-volatile memory devices used today involve one of two general technologies, namely, magnetic recording media and optical recording media. Although both technologies have improved over the years in terms of their reliability, speed, and capacity for data storage, there continues to be a need for non-volatile memory devices with even greater performance. In particular with respect to improving the amount of data that can be stored on a given device, there remains a need for improvements in the amount of digital information that can be stored per unit area ("areal storage density") of the substrates of these recording media.

Specifically with respect to magnetic recording devices, limitations in the long-term stability of very small magnetic domains, and the manufacturing and operational tolerances of the read-write heads employed to interface the magnetic substrates on which data is recorded, presently preclude areal storage densities of greater than about 70–90 Gb/in$^2$ in magnetic recording media. Although further developments in "perpendicular recording" technologies have the potential for improving the areal storage densities of magnetic recording media beyond 100 Gb/in$^2$, this has not yet been demonstrated, as discussed in "Hard Disk Recording Aims To Get Perpendicular" by Peter Singer in the September 2002 issue of *Semiconductor International* (pg 50-54), which is hereby incorporated by reference herein.

As for optical recording devices, these devices in recent years have lagged behind magnetic recording devices in terms of their achievable areal storage densities. The present near-term target for the areal storage densities of optical digital versatile disks (DVDs) is only about 40–50 Gb/in$^2$.

Although optical recording devices have fallen behind magnetic recording devices in terms of their achievable areal storage densities, optical recording devices have certain advantages in comparison with magnetic storage devices that continue to make optical recording devices attractive. In particular, optical recording media are able to reliably store data for much longer time periods (e.g., decades) than magnetic recording media. Also, the light sources and detectors used to store and retrieve data recorded on optical recording media can be positioned significantly farther away from the substrates on which data is recorded than the read-write heads used to store and retrieve data recorded on magnetic recording media. Consequently, optical recording devices are easier to design and somewhat more robust than magnetic recording devices.

The areal storage density of an optical recording medium is largely determined by how small one can make the size of the area or spot that is illuminated on the substrate to store and retrieve information without excessive bit error rates. This "illumination spot size" in turn is determined by the illumination wavelength (diffraction limit) and the numerical aperture of the imaging optics, as discussed generally in "Everything You Wanted To Know About DVD-R.(Technology Information)" by Andy Parsons in the February 2000 issue of *Computer Technology Review* and "Optical Data Storage" by H. Coufal and G. W. Burr in the 2002 issue of *International Trends in Applied Optics* (Chapter 26), each of which is hereby incorporated by reference herein. More specifically, the illumination spot size (A) and maximum areal storage density (D*) in bits per unit area (b) of an optical storage medium respectively depend upon wavelength ($\lambda$) and numerical aperture (NA) as follows:

$$A \sim (\lambda/NA)^2 \qquad (1)$$

$$D^* \sim b/A \qquad (2)$$

In view of the relationships expressed in Equations (1) and (2), one approach for increasing areal storage density D* is to reduce the illumination wavelength and thereby reduce the illumination spot size. This is quite effective, since both the illumination spot size and the areal storage density depend quadratically upon on the wavelength employed.

One cutting-edge attempt at attaining an improved areal storage density in this manner involves substituting a conventional, 820 nm wavelength (red) light source such as a GaAs laser with a 460 nm wavelength (blue) light source such as a blue diode AlGaN laser, as discussed in the article "Blue Laser CD Technology" in *Scientific American*, July, 1996. pp. 48–51, which is hereby incorporated by reference herein. Given that the successful implementation of an optical recording device utilizing a 460 nm wavelength light source would offer nearly a 50% reduction in wavelength vis-à-vis the conventional 820 nm wavelength light source, such an implementation would result in a maximum achievable areal storage density of nearly four times that of conventional devices. Although optical recording devices utilizing blue lasers continue to be pursued, such devices are not yet commercially available.

Theoretically, the areal storage densities of optical recording media can continue to increase as the wavelengths of the light employed in conjunction with those media continue to be decreased below the wavelengths associated with blue light. Practically, however, the use of light of such shorter wavelengths becomes problematic for at least two reasons. First, successful implementation of an optical recording device requires a light source that provides light that is reasonably monochromatic at the wavelength of interest, and that is of sufficient intensity to allow the attainment of satisfactory signal-to-noise ratios. To the extent that it is desired to be able to write data onto the optical storage media, and not just read data, a light source of even stronger intensity is required. At the wavelengths of light at which conventional optical recording devices typically operate, lasers are the only light sources that can effectively provide these characteristics. Yet, economical, solid state lasers providing light at wavelengths lower than those associated with blue light continue to be unavailable.

Second, it is well known that the atmosphere is strongly absorbing for radiation at wavelengths of less than about 190 nm in the "vacuum ultraviolet" range of the electromagnetic spectrum (which is generally defined as including light with wavelengths between about 10 nm and about 190 nm), such that nearly total absorption of such light occurs with transmission through only several millimeters of air at atmospheric pressure. The term "light" when used herein generally is not intended to be limited to a specific range of the electromagnetic spectrum such as the "visible light" region, but rather is intended to encompass radiation of a variety of wavelengths and, in particular, is intended to encompass radiation including the vacuum ultraviolet range of the electromagnetic spectrum. Consequently, light at wavelengths of less than 190 nm is seldom used in practice in optical devices, except in optical devices in which it is practical to limit the transmission of the light through sealed passage(s) that have been evacuated and/or inert gas purged. Because it is excessively expensive and otherwise impractical to utilize such sealed passages in optical recording devices, the use of light at wavelengths in the vacuum ultraviolet range appears to be generally impractical for optical recording devices.

Despite these difficulties associated with optical recording devices using light at shorter wavelengths, it nevertheless would be advantageous if a new optical recording device was developed that could achieve significantly higher areal storage densities than conventional optical recording devices or even cutting-edge optical recording devices that may employ blue light. It would further be advantageous if such a new optical recording device attained areal storage densities that rivaled or even exceeded those of conventional magnetic recording devices, and at the same time still provided the advantages associated with optical recording devices in comparison with magnetic recording devices. Additionally, it would be advantageous if such a new optical recording device did not require the use of vacuum-sealed passages for transmitting light to and from the optical storage media, could operate using a conventional light source, and otherwise was not significantly more complicated or expensive to design or manufacture than conventional optical recording devices.

SUMMARY OF THE INVENTION

The present inventor has recognized that an optical storage and retrieval device employing light in the vacuum ultraviolet region of the electromagnetic spectrum could be advantageous over conventional optical storage and retrieval devices since light in this region has a shorter wavelength than the light used in conventional devices and, consequently, a device employing this shorter-wavelength light could have a higher areal storage density than those of conventional devices. The present inventor has additionally recognized that, while light at most wavelengths in the vacuum ultraviolet region experiences significant absorption as it travels through the atmosphere, light having a wavelength within a small window at approximately 121.6 nm is capable of traveling through the atmosphere with much less absorption, such that light at wavelengths within this window could be effectively utilized in an optical storage and retrieval device without any vacuum sealed passages. Absorption of light by the atmosphere in the vacuum ultraviolet region of the electromagnetic spectrum is principally due to absorption by molecular Oxygen.

Further, the present inventor has recognized that, while solid state lasers do not yet exist that are capable of providing strong, monochromatic light within the vacuum ultraviolet region, Hydrogen lamps giving off light at the Hydrogen Lyman-α line are known, and provide strong, relatively-monochromatic light. Additionally, the present inventor has recognized that the light emitted by such lamps, at the Hydrogen Lyman-α line, happens to be at a wavelength that is essentially identical to that within the above-mentioned window, namely, at a wavelength of approximately 121.6 nm. Given this to be the case, the present inventor has recognized that it is possible to design, using known and relatively inexpensive components, an optical storage and retrieval device that does not require vacuum-sealed passages or a special new laser or other light source for its operation, and yet is capable of operating at a wavelength that is significantly less than those of conventional (or cutting-edge) optical recording devices, so as to allow for significantly improved areal storage densities relative to conventional devices.

In particular, the present invention relates to a method of obtaining information stored on a storage component. The method includes receiving light from the storage component, where the light is indicative of the information stored on the storage component, and where a wavelength of the light is within a window in the vacuum ultraviolet region of the electromagnetic spectrum within which a local minimum in the absorption coefficient of Oxygen occurs, the window being at least one of about 1.0 nm and about 2.0 nm in width.

Further, the present invention relates to a method of obtaining information stored on a storage component. The method includes transmitting light toward the storage component, reflecting at least a first portion of the light off of the storage component, and receiving at least a second portion of the first portion of the light at a receiving device. The received light is indicative of the information stored on the storage component, and the light is at a wavelength within the vacuum ultraviolet region of the electromagnetic spectrum for which the absorption coefficient of Oxygen is less than 25 $atm^{-1}$ $cm^{-1}$ at standard temperature and pressure.

Additionally, the present invention relates to a method of interacting with an optical storage medium. The method includes operating a light source in a manner causing the light source to generate light at a wavelength corresponding to a Hydrogen or Deuterium Lyman-α line, and directing the light generated by the light source toward the optical storage medium.

Further, the present invention relates to a method of storing information on a storage component. The method includes providing a storage medium having an optical characteristic that varies in response to being exposed to light at a first wavelength, and exposing at least a first portion of the storage medium to the light at the first wavelength to cause a change in the optical characteristic of the exposed first portion. The first wavelength of the light is within a window in the vacuum ultraviolet region of the electromagnetic spectrum within which a local minimum in the absorption coefficient of Oxygen occurs, the window being at least one of about 1.0 nm and about 2.0 nm in width.

Additionally, the present invention relates to a method of storing information on a storage component. The method includes providing a storage medium having an optical characteristic that varies in response to being exposed to light at a first wavelength, and exposing at least a first portion of the storage medium to the light at the first wavelength to cause a change in the optical characteristic of the exposed first portion. The first wavelength is within the vacuum ultraviolet region of the electromagnetic spectrum, and an absorption coefficient of Oxygen corresponding to the first wavelength is less than 25 atm$^{-1}$ cm$^{-1}$ at standard temperature and pressure.

Further, the present invention relates to an optical storage device that includes an optical storage medium and a light source capable of generating light that is transmitted to the optical storage medium. The light generated by the light source is at a first wavelength that is within the vacuum ultraviolet region of the electromagnetic spectrum and satisfies at least one of the following criteria: (i) the first wavelength is within about a 1.0 nm-wide window in the vacuum ultraviolet region of the electromagnetic spectrum within which a local minimum in the absorption coefficient of Oxygen occurs; and (ii) an absorption coefficient of Oxygen at standard temperature and pressure that corresponds to the first wavelength is less than 25 atm$^{-1}$ cm$^{-1}$.

Additionally, the present invention relates to an apparatus for interfacing an optical storage medium. The apparatus includes a light source that generates light, and at least one optical component that receives the light generated at the light source and transmits at least a portion of the light to the optical storage medium. The light generated by the light source is at a first wavelength that is within the vacuum ultraviolet region of the electromagnetic spectrum and satisfies at least one of the following criteria: (i) the first wavelength is within about a 1.0 nm-wide window in the vacuum ultraviolet region of the electromagnetic spectrum within which a local minimum in the absorption coefficient of Oxygen occurs; and (ii) the absorption coefficient of Oxygen at standard temperature and pressure that corresponds to the first wavelength is less than 25 atm$^{-1}$ cm$^{-1}$.

DETAILED DESCRIPTION OF THE INVENTION

Figure 1:
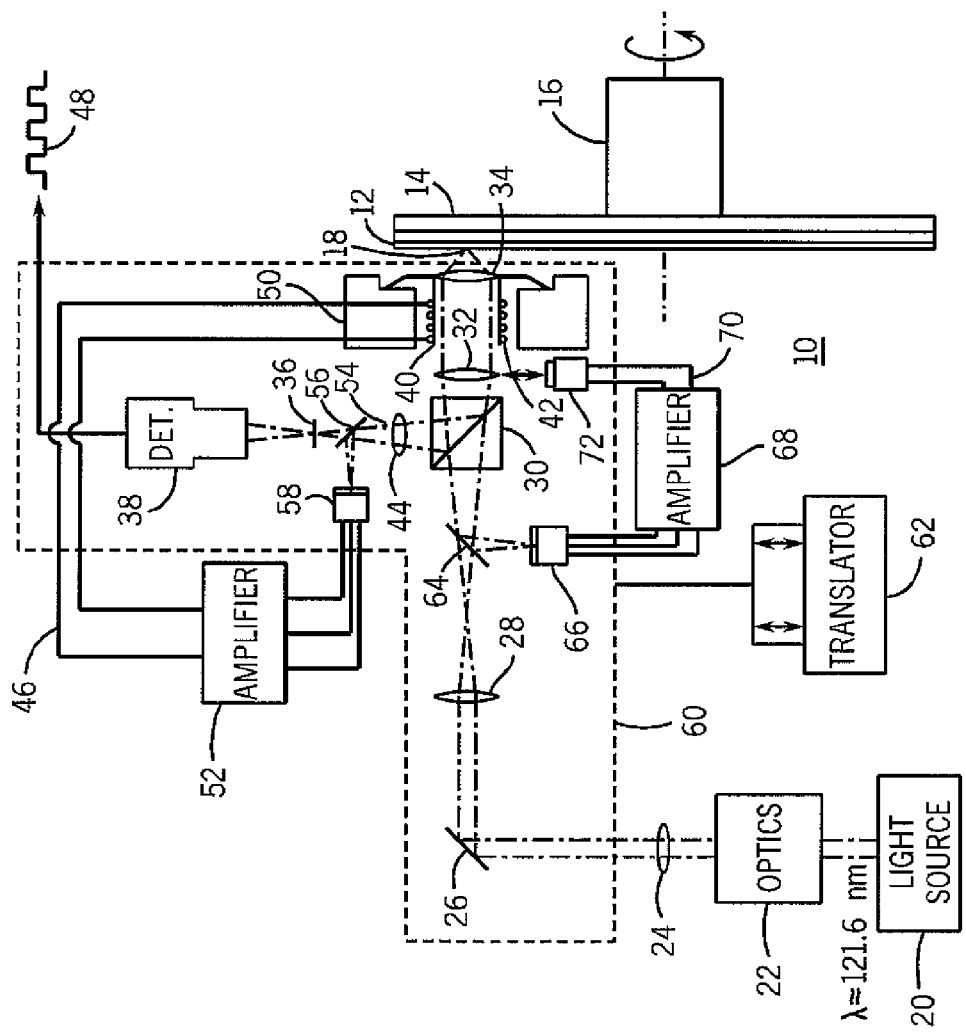
FIG. 1 is a partially diagrammatic and partially schematic view of major components of an exemplary optical data storage and retrieval system in accordance with one embodiment of the present invention.

Referring now to FIG. 1, there is depicted a partially diagrammatic and partially schematic view of an exemplary optical data storage and retrieval system 10 in accordance with one embodiment of the present invention. The system 10 includes a storage disk 12 that is rotatable upon a turntable 14 having a central shank 16 that is utilized to rotate the turntable 14 at a selected rate of speed by a motor (not shown).

The reading of data stored on the disk 12 is accomplished utilizing a light source 20 that is collimated utilizing collimation optics 22. A resulting beam 24 emanating from the optics 22 is then reflected by a mirror 26 and sharply focused utilizing a first lens 28, in a manner well known in the optical art. The light from the lens 28 then passes through a beam splitter 30 and subsequently through a second, condenser lens 32 and a third, objective lens 34, which are utilized to focus the light upon a selected portion or "illumination spot" 18 of the storage disk 12. The term "light" when used herein generally is not intended to be limited to a specific range of the electromagnetic spectrum such as the "visible light" region, but rather is intended to encompass radiation of a variety of wavelengths and, in particular, is intended to encompass radiation including the vacuum ultraviolet region of the electromagnetic spectrum.

In accordance with one embodiment of the present invention, the light source 20 of FIG. 1 emits light having a wavelength of, or at least having wavelengths comprising a small region near 121.6 nm. The small wavelength region can be, for example, approximately 1 nm in size, e.g., a window including wavelengths ranging from 121.0 to 122.0 nm or from 121.1 to 122.1 nm. Alternatively, for example, the small wavelength region can be, for example, approximately 2 nm in size, e.g., a window including wavelengths ranging from 120.5 to 122.5 or from 120.6 to 122.6 (still in other embodiments the window could be 4 nm in size, e.g., ±2 nm on either side of 121.6 nm). The system 10 employs the light source 20 providing light with wavelength(s) at or around 121.6 nm for two reasons.

Figure 4:
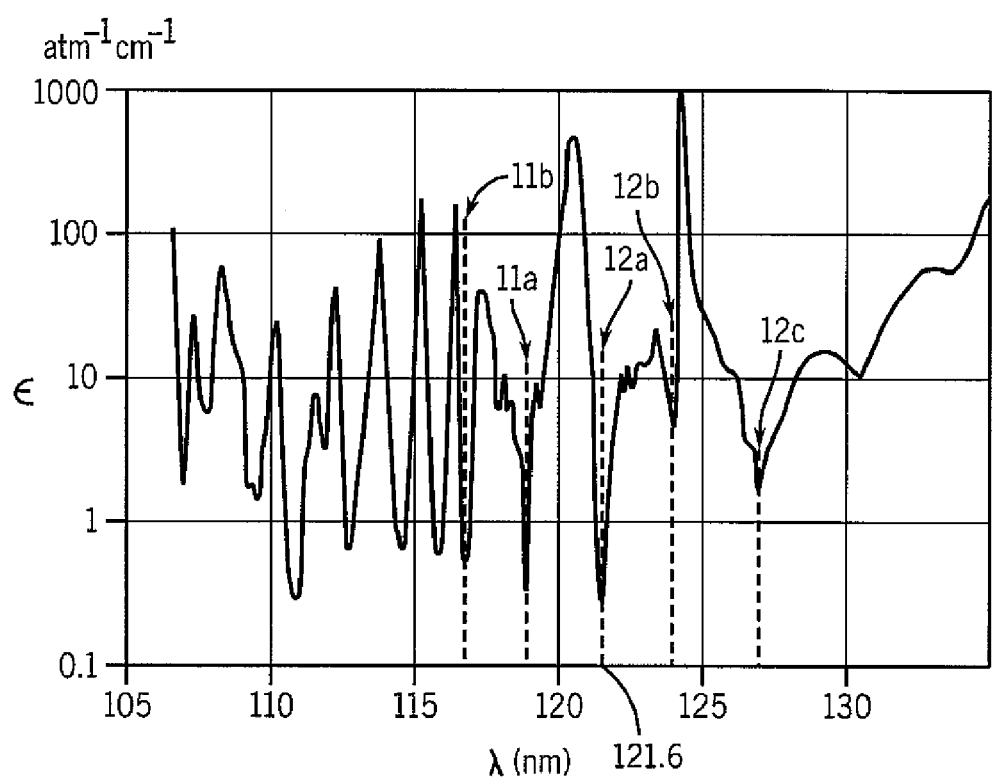
FIG. 4 depicts a plot of the absorption coefficient of Oxygen in the wavelength region of 105 nm to 135 nm.

First, in contrast to light at many other wavelengths in the "vacuum ultraviolet" range of the electromagnetic spectrum (which generally is defined as including light with wavelengths between about 10 nm and about 190 nm), light having wavelength(s) at or around 121.6 nm can be transmitted with relatively little loss through the atmosphere. In particular, as shown in FIG. 4, the absorption coefficient of Oxygen with respect to light having wavelength(s) at or near 121.6 nm is particularly low in comparison with the absorption coefficients for light at essentially all wavelengths longer than 121.6 nm, up to at least about 180 nm. The absorption coefficient of Oxygen $O_2$ ($\epsilon$) for light at 121.6 nm specifically is about 0.3 atm$^{-1}$ cm$^{-1}$, as indicated by an arrow 12a of FIG. 4, which is one to three orders of magnitude less than the absorption coefficients for light at wavelengths between this window and 175 nm.

Figure 2:
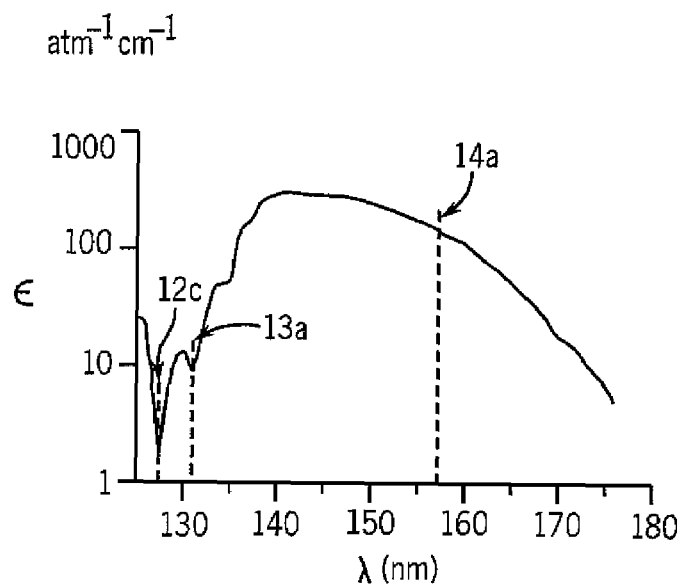
FIG. 2 depicts a plot of the absorption coefficient of Oxygen in the wavelength region of 125 nm to 180 nm.

Given the low absorption coefficient for light having wavelength(s) at or around 121.6 nm, such light can be transmitted over relatively long distances within the optical data storage and retrieval system 10 without the need for an evacuated chamber or inert gas purging, which are impractical for implementation in such a system. For example, if light at 121.6 nm having an absorption coefficient of 0.3 atm$^{-1}$ cm$^{-1}$ is transmitted over a 2 cm distance, the light will only experience about 12% absorption, such that 88% of the light will be transmitted over such transmission path. This is in contrast to the absorption associated with light having a wavelength of, for example, 157 nm (see arrow 14a of FIG. 2), in which nearly total absorption occurs over a transmission path of less than 1 mm as a result of the high absorption coefficient (about 200 atm$^{-1}$ cm$^{-1}$).

Second, the light source 20 provides light having wavelength(s) at or around 121.6 nm because the present inventor has realized that, while intense, relatively-monochromatic light sources are unavailable for emitting light at many of the wavelengths within the vacuum ultraviolet portion of the electromagnetic spectrum, there have been devised intense, relatively monochromatic light sources that provide light at the 121.6 nm wavelength. These light sources exist because the 121.6 nm wavelength happens to coincide with the Hydrogen Lyman-α line existing at 121.568 nm.

A number of Hydrogen Lyman-α line light sources are known in the art. One exemplary, physically small, light source for this wavelength was utilized to measure the absorption cross-section of ammonia in the gas-phase, as discussed in an article by W. Cheung, B. Gelernt, and T. Carrington in *Chem. Phys. Lett.*, 66, 287 (1979), which is hereby incorporated by reference herein. Another exemplary, high intensity source developed more recently is shown in articles by V. Lieberman et al. and Jianxun Yan et al. in the November/December 2002 issue of *J Vac. Sci & Technol. B* (20(6)), which are hereby incorporated by reference herein. This latter light source is capable of providing more than 0.5 J of 121.6 nm radiation per pulse.

Other light sources for providing light at the 121.6 nm wavelength also are known, and/or would be known to one of ordinary skill in the art in view of known technologies. For example, it is known to those skilled in the art of atomic and molecular spectroscopy that microwave excitation of a mixture comprising Hydrogen, (or Deuterium, or Hydrogen containing gases) with noble-gas diluents, such as Helium, produce strong Hydrogen Lyman-α emission. Also, for example, a device for four-wave mixing in metal vapors such as that shown in U.S. Pat. No. 5,185,552 to Suzuki et al., which issued on Feb. 9, 1993 and is hereby incorporated by reference herein, could be implemented to provide light at the 121.6 nm wavelength. The aforementioned light sources are only intended to be exemplary, however, and the present invention is intended to encompass all optical storage and retrieval devices that employ any light sources that produce light having wavelength(s) at or around 121.6 nm, regardless of the particular attributes or designs of those light sources. Additionally, with respect to Hydrogen-based light sources, the present invention is intended to encompass a variety of light sources that employ different isotopes of Hydrogen, including standard Hydrogen (having no neutrons) and Deuterium.

Figure 3:
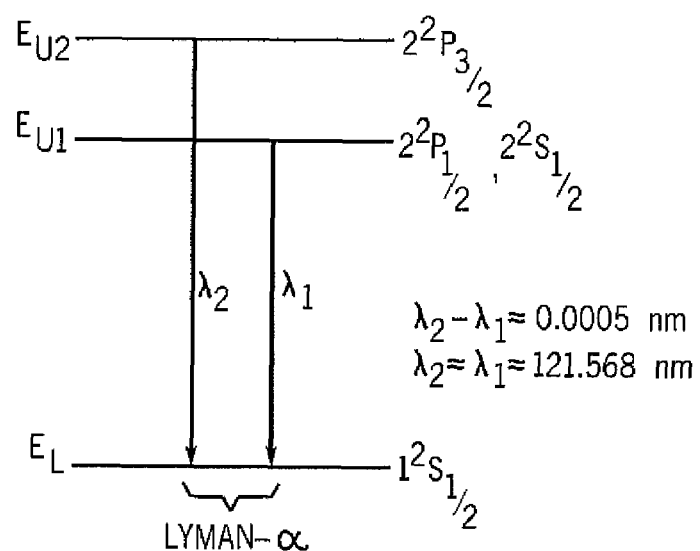
FIG. 3 illustrates a simplified energy level diagram of atomic Hydrogen.

Referring to FIG. 3, it should be noted that, strictly speaking, the Hydrogen Lyman-α line consists of two emission lines that are very close wavelength, separated by only approximately 0.0005 nm. This occurs because the Hydrogen atom has two "nearly degenerate" upper energy states $E_{U1}$ and $E_{U2}$ that are very close but not identical in energy and consequently produce light at two wavelengths. Nevertheless, due to the proximity of the two wavelengths, to a first approximation one can think of Hydrogen Lyman-α radiation as having two very closely spaced lines that are generally additive and combine to form the single Lyman-α line.

Although as discussed above a preferred embodiment of the present invention utilizes light having wavelength(s) at or around 121.6 nm, there are other portions of the vacuum ultraviolet range at which minima in the absorption coefficient of $O_2$ also occur. For example, as shown in FIG. 4 and particularly as indicated by the arrows 12c, 11a and 11b, local minima also occur for light having wavelengths in the vicinity of 127.1 nm, 118.7 nm and 116.7 nm, etc. The preferred embodiment of the present invention uses light at or around 121.6 nm because, as discussed above, light sources exist for providing light in this window due to the coincidence of this window with the Hydrogen Lyman-α line. Nevertheless, alternate embodiments of the present invention also could employ light sources that provide light at or around one or more of these other wavelengths at which local minima (of sufficient depth) in the absorption coefficient of $O_2$ occur, or that provide light at wavelength(s) at which the absorption coefficient of $O_2$ is low (e.g., below 25 $atm^{-1}$ $cm^{-1}$).

Returning to FIG. 1, as is well known in the art, light that is reflected back from the storage disk 12 is then directed by the beam splitter 30 through a pinhole 36 to an optical detector 38. The output of the optical detector 38 then represents a digital data stream 48 which will vary according to the optical characteristics of selected portions of the surface of the disk 12. The optical detector 38 can take the form of any of a number of optical detection devices that are known in the art or would be obvious to one of ordinary skill in the art. For example, the optical detector 38 in certain embodiments is formed by a photodiode or photo-transistor.

Preferably, the optical detector 38 is relatively insensitive to light at wavelengths other than that which is specifically produced by the light source 20 as discussed above. For example, the optical detector 38 could be "solar blind", and insensitive to visible light emissions originating from the light source 20 as well as to ambient light originating elsewhere. Accordingly, in certain embodiments, the optical detectors are solid state detectors with appropriate bandgaps as are known to persons of ordinary skill in the art. The use of such optical detectors that are sensitive only (or disproportionately) to light at or around 121.6 nm (or such other wavelength of interest) would improve the signal-to-noise ratio of the detector. In certain embodiments, given the high energy level of photons at 121.6 nm, it may be possible to induce significant fluorescence when light from the light source 20 is applied to the disk 12, making it possible to achieve further improved signal-to-noise ratios.

Further with reference to FIG. 1, the proper focus of the objective lens 34 in the present embodiment is maintained by affixing the objective lens to a movable diaphragm 40 of a focus head 50 and by varying a first current 46 applied to a coil 42 of the focus head 50. The magnitude and polarity of the current 46 supplied to the focus head 50 can be determined as the output of a first differential amplifier 52 in the following manner. A portion of a reflected beam output 44 of the beam splitter 30 is obscured by a beam obstructor 54 and the thus obscured beam is then applied to beam splitter 56 (positioned in between the beam obstructor and the pinhole 36), which reflects a portion of the beam between two elements of a first bi-element optical detector 58. Given this design, any movement of the objective lens 34 away from proper focus will cause the beam reflected by the beam splitter 56 to blur onto one of the two elements of the bi-element optical detector 58, generating an input to the differential amplifier 52.

Further, tracking along the digital data recorded on the disk 12 is accomplished by using both coarse and vernier position translators. The entire optical head assembly, as included within a dashed line 60, is movable by means of a radial position translator 62. Additionally, for vernier translation, a portion of the beam passing from the first lens 28 to the beam splitter 30 is deflected utilizing an additional beam splitter 64, and the deflected portion of the beam is then focused onto a second bi-element optical detector 66. As in the case of the first bi-element optical detector 58 discussed above, the output of the second bi-element optical detector 66 is utilized to drive a second differential amplifier 68. The output of the second differential amplifier 68 in turn governs the magnitude and polarity of a second current 70 provided to a lens translator 72. The lens translator 72 is then utilized to translate the condenser lens 32, which causes proper tracking of the optically discernible data. The lens translator 72 can be constructed, for example, using a piezoelectric translator.

Although the lenses 28, 32 and 34 as well as the beam splitters 30, 56, and 64 discussed above can be of any appropriate conventional design, in a preferred embodiment these components are manufactured using optical materials that are particularly appropriate for the transmission of light at or around 121.6 nm (or such other wavelength that is of interest). Transmittive optical materials for collimating, imaging and collecting light at or around 121.6 nm in particular are somewhat limited. $CaF_2$ has some transmission, but $MgF_2$ and LiF have intrinsic absorptions at 115 nm and 105 nm, respectively. In certain embodiments, it also may be appropriate to employ reflective, or catadioptic, optical designs in order to focus incident light and collect reflected light.

The writing of data onto the disk 12 can be accomplished using any of a variety of methods known in the art. For example, in one embodiment, information is recorded on the disk 12 by a process in which the temperature of certain portions of the surface of the disk 12 are selectively, temporarily raised above a preselected temperature, in order to melt chemical deposits that exist on the metallic substrate of the disk. Such a process in turn causes one or more optical characteristics (e.g., reflectivity) associated with some or all of those portions of the disk to vary. More specifically, this type of process can be accomplished by operating the light source 20 at a higher power level to temporarily heat the portions of the disk 12. In certain embodiments, the light source 20 can be modulated between the higher power level and a lower power level (or zero-power level) with respect to different portions of disk 12, so as to cause changes in the surface at certain locations but not others, thereby recording information. In the present embodiment, in addition to the movement provided by the translators 62, 72, the disk 12 is rotated to allow for exposure of different portions of the surface of the disk to the light, although other methods of facilitating the exposure of different portions of the disk known to those of ordinary skill in the art could also be employed.

While the Hydrogen Lyman-α light sources employed as the light source 20 in some circumstances may not have photon fluxes equaling that of a solid state laser, such light sources nevertheless are generally capable of providing sufficient photon fluxes for the purpose of writing to the disk 12, for two reasons. First, photons having a wavelength of 121.6 nm as are emitted by Hydrogen Lyman-α light sources are nearly eight times more energetic, respectively, than the photons emitted by light sources employed in conventional, red-light optical recording devices (e.g., the photon energy at 121.6 nm is 10.2 eV, while the photon energy for red light is approximately 1.3 eV). Second, due to the short wavelength(s) of the light used by the system 10, the illumination spot 18 on the disk 12 can be up to 36 times smaller than the illumination spot of a conventional optical recording device employing red light. Consequently, satisfactory fluxes can be achieved at the disk 12 with much less overall light energy output by the light source 20 than must be delivered by the lasers employed in conventional optical recording devices.

The 121.6 nm photons used in the system 10 are of sufficiently high energy as to be capable of breaking most chemical bonds. Therefore the use of this radiation allows not only for photo-physical processes, such as the melting process discussed above, but also photochemical writing processes. For example, U.S. Pat. Nos. 5,645,964 and 5,858,586 to Nohr et al., which respectively issued on Jul. 8, 1997 and Jan. 12, 1999 and which are both hereby incorporated by reference herein, disclose the use of various aromatic molecules, in combination with colored dye substances (such as crystal violet). The molecules absorb ultraviolet light at wavelengths ranging from 300 nm to 4 nm and, upon absorbing the light, can transfer energy (sensitize) the decomposition of the dye substances. Because the irreversibly decomposed dye is far more reflective than the undecomposed dye, it is possible to employ the dye to store information on optical recording media, where the recording of data occurs when light of the appropriate wavelength is applied to the aromatic molecules. In addition to this exemplary photochemical writing process, other photochemical schemes can also be utilized to permanently write digital information once on an optical disk and read such information many times (WORM), or to temporarily write digital information on an optical disk and read such information many times (or, in some circumstances, only one time).

The present invention is advantageous over conventional optical data storage and retrieval devices because of its use of light at wavelengths that are shorter than the light used by such conventional devices. Conventional optical data storage and retrieval devices generally do not use light at wavelengths below the blue range, that is, light at wavelengths of less than 460 nm. In contrast, the present invention employs light at or around 121.6 nm (or at similar ranges within the vacuum ultraviolet region at which local minima in the absorption coefficient of $O_2$ occur), which constitutes nearly a four-fold decrease in wavelength or four-fold increase in frequency. In view of Equations (1) and (2) set forth above, the present invention therefore allows on the order of about a sixteen-fold decrease in illumination spot size and a sixteen-fold increase in areal storage density relative to blue light-based optical recording devices. Further, insofar as conventional optical data storage and retrieval devices typically do not operate using blue light but instead typically utilize light of even longer wavelengths (e.g., red light), the increase in areal storage density afforded by the present invention in comparison with such typical devices is on the order of a 35-fold increase. Because of the increase in areal storage density afforded by the use of light in the vacuum ultraviolet range, it not only becomes possible to increase the amount of data stored on an optical recording medium of given size, but also becomes possible to reduce the overall size of the optical recording medium (e.g., by reducing the diameter of the recording disks) without reducing the overall data storage capacity of the medium.

The use of such short wavelength light by the present invention offers additional advantages as well. As discussed above, the light source 20 can be of relatively less power than the light sources employed in conventional optical recording devices since the photons at short wavelengths are more energetic than photons at the longer wavelengths employed conventionally, and since the illumination spot 18 that is used is of reduced size relative to that of conventional optical recording devices, thus allowing for a greater concentration of the energy produced by the light source. Further, the resolution, R, and the depth of field, DOF, of the imaging optics of an optical recording device vary linearly with the wavelength of the light employed as follows:

$$R \sim (2f/D) \cdot \lambda \qquad (3)$$

$$DOF \sim \pi(f/D)^2 \cdot \lambda \qquad (4)$$

where f is the focal length of the imaging lens and D is the effective aperture. Given equation 3 and equation 4, one can see that the "control complexity" of the imaging system varies linearly with wavelength, while the imaged area, and therefore the data storage density, varies quadratically with wavelength.

Although the optical data storage and retrieval system 10 of FIG. 1 is one example of an optical recording device in accordance with the present invention, the present invention is not intended to be limited to the specific structures, components, and methods discussed in relation to that embodiment. A variety of optical data storage and retrieval systems and processes other than those shown in relation to FIG. 1 are known in the art, and the present invention is intended to encompass all such systems and processes that could be utilized to construct an optical data storage and retrieval system that utilizes light at wavelengths within the above-discussed window about 121.6 nm and/or within other absorption windows that exist in the vacuum ultraviolet range. Generally speaking, therefore, the present invention is intended to encompass any optical systems or processes that involve directing light at wavelengths within the above-discussed window(s) toward an optical recording medium, and are capable of detecting the light reflected off of that medium to obtain data stored on that medium and/or are capable of varying the light or some other characteristic of the system in order to store data on that medium. While the present invention includes systems that store data on disk-type media that rotate, the present invention also is intended to encompass systems that record data on a medium of any shape or size, regardless of whether it rotates, translates or remains stationary during the processes of storing and/or retrieving data.

Therefore, the above description has been that of a preferred embodiment of the present invention. It will occur to those that practice the art that many modifications may be made without departing from the spirit and scope of the invention. In order to apprise the public of the various embodiments that may fall within the scope of the invention, the following claims are made.

I claim:

1. A method of obtaining information stored on a storage component, the method comprising:
  receiving light from the storage component,
  wherein the light is indicative of the information stored on the storage component, and
  wherein a wavelength of the light is within a window in the vacuum ultraviolet region of the electromagnetic spectrum within which a local minimum in the absorption coefficient of Oxygen occurs, the window being at least one of about 1.0 nm and about 2.0 nm in width.

2. The method of claim 1, wherein the wavelength of the light is approximately 121.6 nm.

3. The method of claim 1, further comprising:
  transmitting the light to the storage component, wherein the received light is reflected by the storage component in response to the transmitting of the light to the storage component.

4. The method of claim 3, further comprising:
  generating the light at a light source.

5. The method of claim 4, wherein the light source includes at least one of Hydrogen and Deuterium.

6. The method of claim 4, wherein the light source generates the light as a result of a gas discharge process, and wherein the wavelength of the light corresponds to a Hydrogen Lyman-α emission line.

7. The method of claim 4, wherein gas is excited by way of microwave energy within the light source to generate the light.

8. The method of claim 4, wherein the light generated by the light source is transmitted to the storage component by way of at least one optical device selected from the group consisting of a mirror, a beam splitter and a lens.

9. A method of obtaining information stored on a storage component, the method comprising:
  transmitting light toward the storage component;
  reflecting at least a first portion of the light off of the storage component; and
  receiving at least a second portion of the first portion of the light at a receiving device,
  wherein the received light is indicative of the information stored on the storage component, and
  wherein the light is at a wavelength within the vacuum ultraviolet region of the electromagnetic spectrum for which the absorption coefficient of Oxygen is less than 25 atm$^{-1}$ cm$^{-1}$ at standard temperature and pressure.

10. The method of claim 9, further comprising generating the light at a light source by way of a gas discharge process, wherein the wavelength corresponds to a Hydrogen Lyman-α discharge line.

11. A method of interacting with an optical storage medium, the method comprising:
  operating a light source in a manner causing the light source to generate light at a wavelength corresponding to a Hydrogen or Deuterium Lyman-α line; and
  directing the light generated by the light source toward the optical storage medium.

12. The method of claim 11, further comprising:
  receiving a reflected portion of the light that is directed toward the optical storage medium after being reflected off of the optical storage medium, wherein the received, reflected portion of the light is indicative of information stored on the optical storage medium.

13. The method of claim 11, wherein the light directed toward the optical storage medium causes a change in an optical characteristic of a portion of the optical storage medium when the light reaches the optical storage medium.

14. The method of claim 13,
  wherein the light source is operable to generate the light at a higher-power level and also at a lower-power level, and
  wherein, when at the higher-power level, the light causes the change in the optical characteristic of the portion of the optical storage medium and, when at the lower-power level, the light is only reflected off of the optical storage medium and does not change the optical characteristic.

15. A method of storing information on a storage component, the method comprising:
  providing a storage medium having an optical characteristic that varies in response to being exposed to light at a first wavelength; and
  exposing at least a first portion of the storage medium to the light at the first wavelength to cause a change in the optical characteristic of the exposed first portion;
  wherein the first wavelength of the light is within a window in the vacuum ultraviolet region of the electromagnetic spectrum within which a local minimum in the absorption coefficient of Oxygen occurs, the window being at least one of about 1.0 nm and about 2.0 nm in width.

16. The method of claim 15, wherein the optical characteristic is a reflectivity of the storage medium, and the exposing of the first portion of the storage medium to the light causes a melting of a deposit associated with the first portion so as to change the reflectivity of the storage medium at the first portion.

17. The method of claim 15, further comprising exposing successive portions of the storage medium to the light at the first wavelength to cause changes in the optical characteristic of the exposed successive portions.

18. The method of claim 17, wherein the storage medium is rotated so that the first and successive portions of the storage medium are exposed to the light, and wherein the light is at a wavelength of approximately 121.6 nm.

19. The method of claim 17, further comprising exposing further portions of the storage medium to the light at the first wavelength, wherein the changes in the optical characteristic are caused when the light has an intensity above a threshold, and wherein the intensity of the light is modulated as the first, successive and further portions of the storage medium are exposed to the light so that the optical characteristic is changed with respect to the first and successive portions but not the further portions, such that information is stored on the storage medium.

20. A method of storing information on a storage component, the method comprising:
    providing a storage medium having an optical characteristic that varies in response to being exposed to light at a first wavelength; and
    exposing at least a first portion of the storage medium to the light at the first wavelength to cause a change in the optical characteristic of the exposed first portion;
    wherein the first wavelength is within the vacuum ultraviolet region of the electromagnetic spectrum, and wherein an absorption coefficient of Oxygen corresponding to the first wavelength is less than 25 $atm^{-1}$ $cm^{-1}$ at standard temperature and pressure.

21. An optical storage device comprising:
    an optical storage medium; and
    a light source capable of generating light that is transmitted to the optical storage medium;
    wherein the light generated by the light source is at a first wavelength that is within the vacuum ultraviolet region of the electromagnetic spectrum and satisfies at least one of the following criteria:
    (i) the first wavelength is within about a 1.0 nm-wide window in the vacuum ultraviolet region of the electromagnetic spectrum within which a local minimum in the absorption coefficient of Oxygen occurs; and
    (ii) an absorption coefficient of Oxygen at standard temperature and pressure that corresponds to the first wavelength is less than 25 $atm^{-1}$ $cm^{-1}$.

22. The optical storage device of claim 21, wherein the light source generates the light by way of a gas discharge process, and the first wavelength of the light corresponds to a Hydrogen Lyman-α line or a Deuterium Lyman-α line.

23. The optical storage device of claim 22, wherein the light source operates to perform the gas discharge process by exciting a gaseous Hydrogen isotope using microwave energy.

24. The optical storage device of claim 21, wherein the light source is capable of being varied in its power output so as to provide a higher-level power output and one of a lower-level power output and a zero-level power output.

25. The optical storage device of claim 24, wherein the optical storage medium includes a surface having an optical characteristic that is capable of varying with location along the surface.

26. The optical storage device of claim 25, wherein the optical characteristic is reflectivity.

27. The optical storage device of claim 26, wherein the optical storage medium includes a substrate surface on which a chemical coating is deposited, wherein the chemical coating melts when exposed to light that is provided by the light source at the higher-level power output, wherein the chemical coating has a first reflectivity prior to the melting and a second reflectivity after the melting upon returning to a solid phase, and wherein the optical storage medium is a disk that is rotatable.

28. The optical storage device of claim 21, further comprising an optical component that is optically coupled between the light source and the optical storage medium, wherein the optical component focuses the light generated by the light source into an illumination spot on the optical storage medium.

29. The optical storage device of claim 21, further comprising a sensing component, wherein at least a portion of the light that is transmitted to the optical storage medium is reflected by the optical storage medium and received by the sensing component.

30. The optical storage device of claim 29, wherein the sensing component is capable of detecting information stored on the optical storage medium based upon the received portion of the light.

31. An apparatus for interfacing an optical storage medium, the apparatus comprising:
    a light source that generates light; and
    at least one optical component that receives the light generated at the light source and transmits at least a portion of the light to the optical storage medium;
    wherein the light generated by the light source is at a first wavelength that is within the vacuum ultraviolet region of the electromagnetic spectrum and satisfies at least one of the following criteria:
    (i) the first wavelength is within about a 1.0 nm-wide window in the vacuum ultraviolet region of the electromagnetic spectrum within which a local minimum in the absorption coefficient of Oxygen occurs; and
    (ii) the absorption coefficient of Oxygen at standard temperature and pressure that corresponds to the first wavelength is less than 25 $atm^{-1}$ $cm^{-1}$.

32. The apparatus of claim 31, further comprising:
    means for receiving reflected light that is reflected by the optical storage medium and producing a signal in response thereto, wherein the reflected light includes at least a first portion of the light generated by the light source, and wherein the reflected light is indicative of information stored on the optical storage medium.

33. The apparatus of claim 32, wherein the at least one optical component includes a first mirror that receives the light from the light source, a first lens that focuses the light, a beam splitter that further transmits the light, and a second lens that focuses the light upon the optical storage medium, and wherein the light reflected by the optical storage medium is transmitted through the lens to the beam splitter, and at least a second portion of the light is transmitted by way of the beam splitter toward the receiving means.

34. The apparatus of claim 33, further comprising at least one device for varying the focusing provided by the second lens by moving the second lens.

35. The apparatus of claim 31, wherein the first wavelength of the light corresponds to a Hydrogen Lyman-α line or a Deuterium Lyman-α line.

* * * * *